(12) United States Patent
Zheng

(10) Patent No.: US 11,822,617 B2
(45) Date of Patent: Nov. 21, 2023

(54) APPARATUS AND METHOD FOR MATRIX MULTIPLICATION USING PROCESSING-IN-MEMORY

(71) Applicant: NeoNexus Pte. Ltd., Singapore (SG)

(72) Inventor: Qilin Zheng, Beijing (CN)

(73) Assignee: NEONEXUS PTE. LTD., Singapore (SG)

( * ) Notice: Subject to any disclaimer, the term of this patent is extended or adjusted under 35 U.S.C. 154(b) by 687 days.

(21) Appl. No.: 17/037,633

(22) Filed: Sep. 29, 2020

(65) Prior Publication Data

US 2022/0012303 A1 Jan. 13, 2022

Related U.S. Application Data

(63) Continuation of application No. PCT/CN2020/100617, filed on Jul. 7, 2020.

(51) Int. Cl.
*G06F 17/16* (2006.01)
*G06N 3/063* (2023.01)
*G06F 9/50* (2006.01)

(52) U.S. Cl.
CPC ............ *G06F 17/16* (2013.01); *G06F 9/5027* (2013.01); *G06F 9/5061* (2013.01); *G06N 3/063* (2013.01)

(58) Field of Classification Search
CPC ...... G06F 17/16; G06F 9/5027; G06F 9/5061; G06N 3/063; G11C 2207/104; G11C 8/12
See application file for complete search history.

(56) References Cited

U.S. PATENT DOCUMENTS

2016/0224465 A1* 8/2016 Morad ................... G06F 9/3887

OTHER PUBLICATIONS

P. Chi, et al., PRIME: A Novel Processing-in-memory Architecture for Neural Network Computation in ReRAM-based Main Memory, 2016 ACM/IEEE 43rd Annual International Symposium on Computer Architecture, IEEE Computer Society 2016 (Year: 2016).*
L. Song, et al., PipeLayer: A Pipelined ReRAM-Based Accelerator for Deep Learning, 2017 IEEE International Symposium on High Performance Computer Architecture, IEEE Computer Society, 2017 (Year: 2017).*
S. Angizi et al., DIMA: A Depthwise CNN In-Memory Accelerator, ICCAD '18, Association for Computing Machinery, 2018 (Year: 2018).*
Q. Zheng et al., Lattice: An ADC/DAC-less ReRAM-based Processing-In-Memory Architecture for Accelerating Deep Convolution Neural Networks, IEEE 2020 (Year: 2020).*

* cited by examiner

*Primary Examiner* — Emily E Larocque
(74) *Attorney, Agent, or Firm* — Bayes PLLC

(57) ABSTRACT

Embodiments of apparatus and method for matrix multiplication using processing-in-memory (PIM) are disclosed. In an example, an apparatus for matrix multiplication includes an array of PIM blocks in rows and columns, a controller, and an accumulator. Each PIM block is configured into a computing mode or a memory mode. The controller is configured to divide the array of PIM blocks into a first set of PIM blocks each configured into the memory mode and a second set of PIM blocks each configured into the computing mode. The first set of PIM blocks are configured to store a first matrix, and the second set of PIM blocks are configured to store a second matrix and calculate partial sums of a third matrix based on the first and second matrices. The accumulator is configured to output the third matrix based on the partial sums of the third matrix.

18 Claims, 9 Drawing Sheets

APPARATUS AND METHOD FOR MATRIX MULTIPLICATION USING PROCESSING-IN-MEMORY

CROSS REFERENCE TO RELATED APPLICATION

This application is continuation of International Application No. PCT/CN2020/100617, filed on Jul. 7, 2020, entitled "APPARATUS AND METHOD FOR MATRIX MULTIPLICATION USING PROCESSING-IN-MEMORY," which is hereby incorporated by reference in its entirety.

BACKGROUND

Embodiments of the present disclosure relate to processing-in-memory (PIM).

Ultra-low power machine learning processors are essential to performing cognitive tasks for embedded systems as the power budget are limited, e.g., with batteries or energy harvesting sources. However, the data generated by deep convolution neural network (DCNN) incurs heavy traffic between memory and computing units in conventional von Neumann architectures, and adversely affects the energy efficiency of these systems. Resistive random-access memory (ReRAM) based nonvolatile PIM (NVPIM) emerges as a promising solution of accelerating DCNN executions. The high cell density of ReRAM allows large on-chip ReRAM arrays to be implemented on the chip to store the parameters of the DCNN while proper functions, e.g., vector-matrix multiplications (VMM), can be directly performed in the ReRAM arrays and their peripheral circuits.

SUMMARY

Embodiments of apparatus and method for matrix multiplication using PIM are disclosed herein.

In one example, an apparatus for matrix multiplication includes an array of PIM blocks in rows and columns, a controller, and an accumulator. Each PIM block is configured into a computing mode or a memory mode. The controller is configured to divide the array of PIM blocks into a first set of PIM blocks each configured into the memory mode and a second set of PIM blocks each configured into the computing mode. The first set of PIM blocks are configured to store a first matrix, and the second set of PIM blocks are configured to store a second matrix and calculate partial sums of a third matrix based on the first and second matrices. The accumulator is configured to output the third matrix based on the partial sums of the third matrix.

In some embodiments, the first set of PIM blocks consists of a row of the array of PIM blocks, and the second set of PIM blocks consists of a remainder of the array of PIM blocks.

In some embodiments, dimensions of the first set of PIM blocks are smaller than dimensions of the first matrix. In some embodiments, the controller is configured to map the first matrix to the first set of PIM blocks such that the first set of PIM blocks store part of the first matrix at a same time based on the dimensions of the first set of PIM blocks.

In some embodiments, the apparatus further includes a multiplexer (MUX) between the first and second sets of PIM blocks. In some embodiments, the controller is further configured to control the MUX to direct data from each PIM block of the first set of PIM blocks to the PIM blocks in a corresponding column of the second set of PIM blocks.

In some embodiments, at least one PIM block of the first set of PIM blocks is not in the same corresponding column.

In some embodiments, dimensions of the second set of PIM blocks match dimensions of the second matrix.

In some embodiments, the second matrix has three or more dimensions. In some embodiments, the controller is configured to map the second matrix to the second set of PIM blocks such that each PIM block of the second set of PIM blocks stores a respective portion of the second matrix.

In some embodiments, the controller is configured to control the second set of PIM blocks to perform convolution of the first and second matrices in calculating the partial sums of the third matrix.

In some embodiments, the first matrix comprises a feature map in a convolution neural network (CNN), and the second matrix comprises a kernel of the CNN.

In some embodiments, each PIM block in the array of PIM blocks comprises a memory array and a vector-vector multiplication (VVM) engine configured to be disabled in the memory mode.

In another example, a PIM device includes a memory array, a vector-vector multiplication (VVM) engine, and a control circuit. The memory array is configured to store a first vector. The control circuit is configured to, in a computing mode, enable the VVM engine and control the VVM engine to perform a dot product between the first vector and a second vector to generate a partial sum. The control circuit is also configured to, in a memory mode, disable the VVM engine and control the memory array to write in or read out the first vector In some embodiments, the VVM engine includes a bit counter, a shift accumulator, and a plurality of AND gates.

In some embodiments, the PIM device further includes a first buffer configured to receive and buffer the second vector from another PIM device.

In some embodiments, the PIM device further includes a second buffer configured to buffer and send the partial sum to another PIM device.

In some embodiments, the memory array includes a ReRAM array.

In still another example, a method for matrix multiplication implemented by an array of PIM blocks in rows and columns is disclosed. A first set of PIM blocks of the array of PIM blocks each is configured, by a controller, into a memory mode, and a second set of PIM blocks of the array of PIM blocks each is configured, by the controller, into a computing mode. A first matrix is mapped, by the controller, to the first set of PIM blocks, and a second matrix is mapped, by the controller, to the second set of PIM blocks. Partial sums of a third matrix are calculated, by the second set of PIM blocks, based on the first and second matrices. The third matrix is generated based on the partial sums of the third matrix.

In some embodiments, the first set of PIM blocks consists of a row of the array of PIM blocks, and the second set of PIM blocks consists of a remainder of the array of PIM blocks.

In some embodiments, dimensions of the first set of PIM blocks are smaller than dimensions of the first matrix. In some embodiments, part of the first matrix is stored, by the first set of PIM blocks, at a same time based on the dimensions of the first set of PIM blocks.

In some embodiments, data from each PIM block of the first set of PIM blocks is directed, by a MUX between the first and second sets of PIM blocks, to the PIM blocks in a corresponding column of the second set of PIM blocks.

In some embodiments, at least one PIM block of the first set of PIM blocks is not in the same corresponding column.

In some embodiments, dimensions of the second set of PIM blocks match dimensions of the second matrix.

In some embodiments, the second matrix has three or more dimensions. In some embodiments, a respective portion of the second matrix is stored by each PIM block of the second set of PIM blocks.

In some embodiments, to calculate the partial sums of the third matrix, convolution of the first and second matrices is performed.

In some embodiments, the first matrix includes a feature map in a CNN, and the second matrix includes a kernel of the CNN.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of a person skilled in the pertinent art to effect such feature, structure or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context.

Existing ReRAM-based NVPIM architectures are mainly in a mixed-signal manner. For instance, some NVPIM devices include a large number of digital/analog converters and analog/digital converters (ADC/DAC) to transform digital inputs into analog signals for PIM operations, and then convert the computing results back to digital format, respectively. The ADC/DACs, however, dominate the area and power consumption of these PIM designs. Digital PIM architectures were proposed to improve the energy efficiency by eliminating A/D conversions and improve the overall design resilience to such stochasticity. Some NVPIM devices, for example, attempt to implement VMM using in-memory 'NOR' logic operations. However, the in-memory 'NOR' logic operations require initialization of the memory cells to low resistant state (LRS) at the beginning of each 'NOR' operation. Additional memory space is also required to store every intermediate 'NOR' result when combining 'NOR' logics to compute multiplication or accumulation. Moreover, the high performance of the existing NVPIM architectures is achieved at the cost of excessive data copies or writes.

Figure 1:
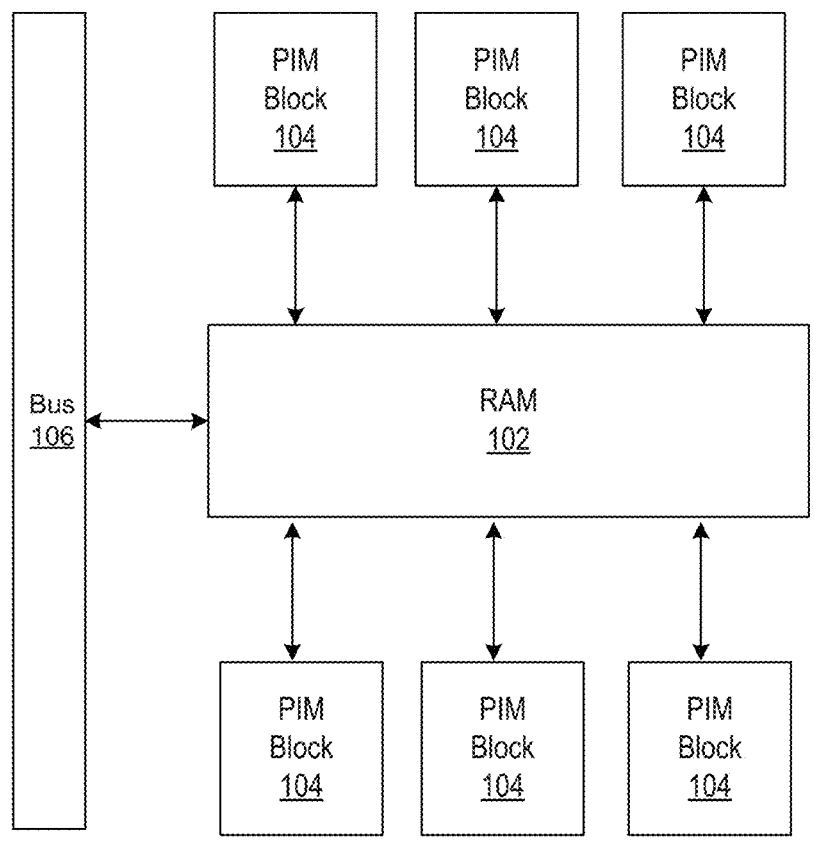
FIG. 1 illustrates a block diagram of an apparatus including an array of PIM blocks.

At the higher level, when performing matrix multiplication in CNN, known NVPIM architectures usually employ the NVPIM blocks as the computing devices in conjunction with a random-access memory (RAM) for storing input and output data as well as intermediate results from the calculations. For example, FIG. 1 illustrates a block diagram of an apparatus 100 including an array of PIM blocks. Apparatus 100 includes a RAM 102, an array of PIM blocks 104, and a bus 106. Each PIM block 104 includes ADCs and DACs for transforming digital inputs into analog signals for PIM operations and then converting the computing results back to digital format, respectively. Each PIM block 104 also includes a ReRAM array, each of which is configured to be switched between two or more levels by applying electrical excitation with different amplitudes and duration. Each ReRAM element represents the vector by the voltages on the inputs, and then the bit line currents collected at the outputs form the VMM result. The input and output data are transmitted through bus 106, e.g., a main/system bus of apparatus 100, and stored in RAM 102, e.g., a main/system memory of apparatus 100, instead of in a PIM block 104. Intermediate data also needs to be exchanged frequently between each PIM block 104 and RAM 102 during the matrix multiplication.

Various embodiments in accordance with the present disclosure provide reconfigurable PIM architectures with higher energy efficiency and flexibility in various matrix multiplication applications, such as convolution in CNN. At the PIM block level, each PIM block can be reconfigured into either computing mode or memory mode. In the computing mode, the partial sums of the dot products between vectors can be calculated in a digital circuit, namely a VVM engine, to eliminate the expensive ADC/DACs. At the higher level, an array of identical PIM blocks and multiple MUXs can be reconfigured to an optimized arrangement depending on the specific task to be performed. In some embodiments, the array of PIM blocks are configured into a first set of PIM blocks in the memory mode and a second set of PIM blocks in the computing mode for performing matrix multiplication, such as in convolution layers of CNN. For example, the data of the features map and the weights of the kernel may be aligned using an efficient data mapping scheme based on the configuration of the array of PIM blocks, thereby avoiding the excessive data copies or writes in the previous NVPIM architectures.

Figure 2:
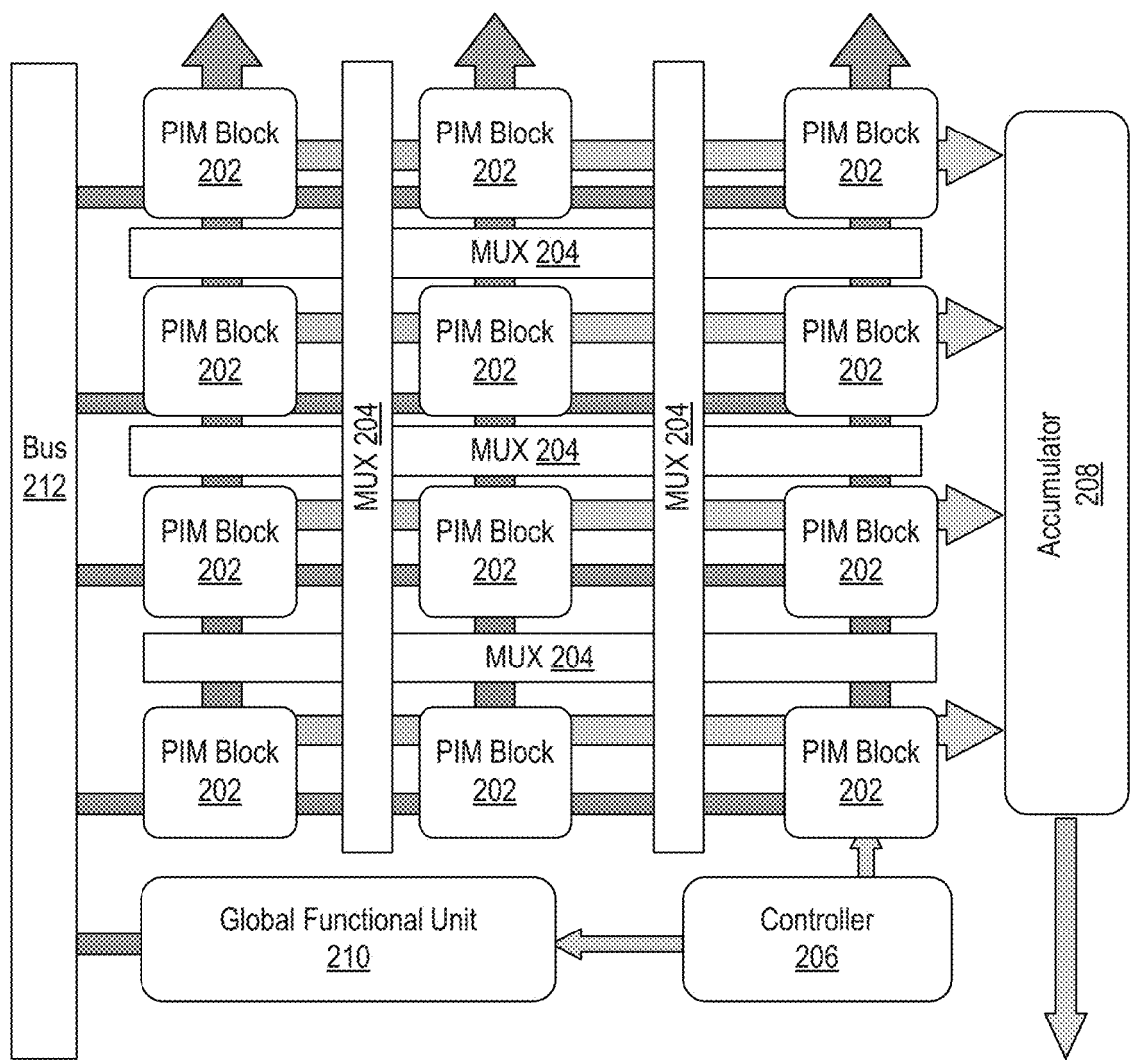
FIG. 2 illustrates a block diagram of an exemplary apparatus including an array of reconfigurable PIM blocks, according to some embodiments of the present disclosure.

FIG. 2 illustrates a block diagram of an exemplary apparatus 200 including an array of reconfigurable PIM blocks, according to some embodiments of the present disclosure. Apparatus 200 can include an array of PIM blocks 202, a plurality of MUXs 204, a controller 206, an accumulator 208, a global functional unit 210, and a bus 212. Each PIM block 202 can be identical and configured into either the memory mode for storing data, e.g., a vector or a matrix in two or more dimensions, or the computing mode for storing data as well as performing vector/matrix calculations, such as VMM or VVM. As the change of the specific task to be performed, e.g., computations in convolution layers or fully connected (FC) layers in CNN, each PIM block 202 can be reconfigured between the computing mode and memory mode based on the computation scheme of the specific task. In some embodiments, although the layout of array of PIM blocks 202 is preset, e.g., in orthogonal rows and columns, the configuration of MUXs 204 is flexible to change depending on the specific task to be performed. For example, by enabling and disabling certain MUXs 204 between different rows of PIM blocks 202, the arrangement of array of PIM blocks 202 may be configured to adapt the computation scheme and data flow corresponding to the specific task. The enabled MUX(s) 204 divide array of PIM blocks 202 into two or more sets, each of which is configured into the same computing or memory mode, according to some embodiments. Moreover, although the default data flow between PIM blocks 202 is in the same row and/or column, the enabled MUX(s) 204 can further redirect the data flow between different rows and/or columns as needed by the specific task.

Bus 212 can be a main/system bus of apparatus 200 for transmitting input data, such as matrices, to array of PIM blocks 202. Different from apparatus 100 in FIG. 1, which includes centralized RAM 102 for storing input and out data as well as intermediate results, a set of PIM blocks 202 in apparatus 200 can be configured into memory mode to replace RAM 102. As a result, the data flows are no longer between each PIM block 104 and centralized RAM 102, but rather follow specific paths based on the arrangement of array of PIM blocks 202, for example, the layout of array of PIM blocks 202 and/or the configuration of MUXs 204, according to some embodiments. The outputs of array of PIM blocks 202, e.g., partial summations (sums), can be sent to accumulator 208, which can be further configured to generate the output matrix based on the partial sums.

In some embodiments, global functional unit 210 is configured to perform any suitable global miscellaneous functions, such as pooling, activation, and encoding scheme, etc. For example, global function unit 210 may perform a zero-flag encoding scheme to save unnecessary writes of the zero values into the memory array. An additional column may be added by global functional unit 210 into the memory array to store a zero-flag corresponding to the high-precision data that are stored in multiple columns of the memory array. The default value of the zero-flag may be '0', indicating that the data is non-zero. If a data is zero, the zero-flag may be set to '1' indicating not to perform the writes to the memory cells to save the write energy. During the preparation phase as described below in detail, the loaded bits of a data that is marked as zero may be all set to '0' if the data's zero-flag is '1.' Controller 206 is configured to control the operations of other components of apparatus 100, for example, the data mapping and flow and the computation scheme of array of PIM blocks 202 and MUXs 204. In some embodiments, controller 206 is also configured to reconfigure the data precision of every VVM operation.

Figure 3:
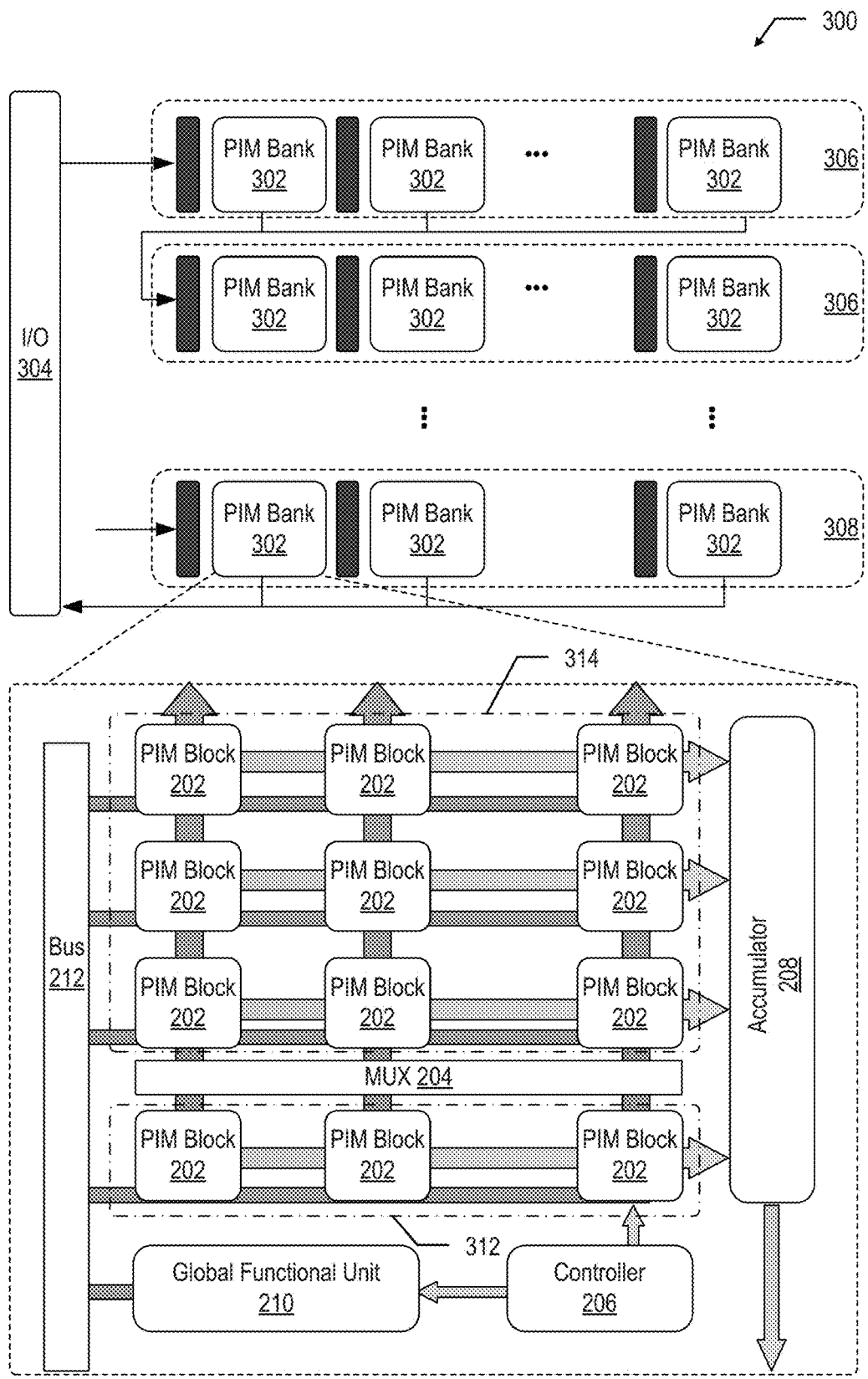
FIG. 3 illustrates a block diagram of an exemplary apparatus including an array of PIM blocks for matrix multiplication, according to some embodiments of the present disclosure.

FIG. 3 illustrates a block diagram of an exemplary apparatus 300 including an array of PIM blocks for matrix multiplication, according to some embodiments of the present disclosure. Apparatus 300 can include a plurality of PIM banks 302 each for matrix multiplication and an input/output (I/O) interface 304 configured to exchange data with other devices, e.g., a host processor and/or a system memory. In some embodiments, apparatus 300 is configured to perform various operations in CNN. For example, some groups of PIM banks 306 may receive an image from I/O interface 304, perform operations in the convolution layers in CNN, and generate intermediate feature maps. Another group of PIM banks 308 may receive the intermediate feature maps, perform operations in the FC layer in CNN, and generate labels of the image sent back to I/O interface 304.

FIG. 3 further shows an exemplary PIM bank 302 for performing matrix multiplication in the convolution layer and FC layer in CNN. PIM bank 302 in FIG. 3 may be one example of apparatus 200 in FIG. 2, which is configured based on the matrix multiplication task in the convolution layer and FC layer in CNN as described below in detail. In some embodiments, controller 206 is configured to divide array of PIM blocks 202 into a first set of PIM blocks 312 each configured into the memory mode and a second set of PIM blocks 314 each configured into the computing mode. First set of PIM blocks 312 can be configured to store a first matrix, such as an input feature map in CNN. Second set of PIM blocks 314 can be configured to store a second matrix, such as a kernel of the CNN, and calculate partial sums of a third matrix, such as an output feature map, based on the first and second matrices. In some embodiments, accumulator 208 is configured to receive the partial sums from second set of PIM blocks 314 and output the third matrix based on the partial sums of the third matrix. For example, accumulator 208 may generate each element of the third matrix based on the corresponding partial sums.

As shown in FIG. 3, first set of PIM blocks 312 consists of a row of array of PIM blocks 202, for example, the first row of array of PIM blocks 202, according to some embodiments. Second set of PIM blocks 312 then consists of the remainder of array of PIM blocks 202, according to some embodiments. In some embodiments, only one of MUXs 204, which is between first and second sets of PIM blocks 314 and 312, is enabled. That is, controller 206 can be configured to enable MUX 204 between the first and second rows of array of PIM blocks 202 and disable the rest of MUXs 204 (not shown in FIG. 3) to divide array of PIM blocks 202 into first set of PIM blocks 312 in memory mode and second set of PIM blocks 314 in computing mode. As described below in detail, controller 206 can be further configured to control MUX 204 to direct data from each PIM block 202 of first set of PIM blocks 312 to PIM blocks 202 in the corresponding column of second set of PIM blocks 314. The data flow paths between first and second sets of PIM blocks 312 and 314 may be changed at different phases in matrix multiplication as controlled by controller 206 based on the corresponding matrix multiplication scheme. For example, at least one PIM block 202 of first set of PIM blocks 312 may not be in the same corresponding column. In one example, the data loaded in the first column of first set of PIM blocks 312 may be redirected by MUX 204 to the second column, third column, or any column other than the first column of second set of PIM blocks 314.

Figure 4:
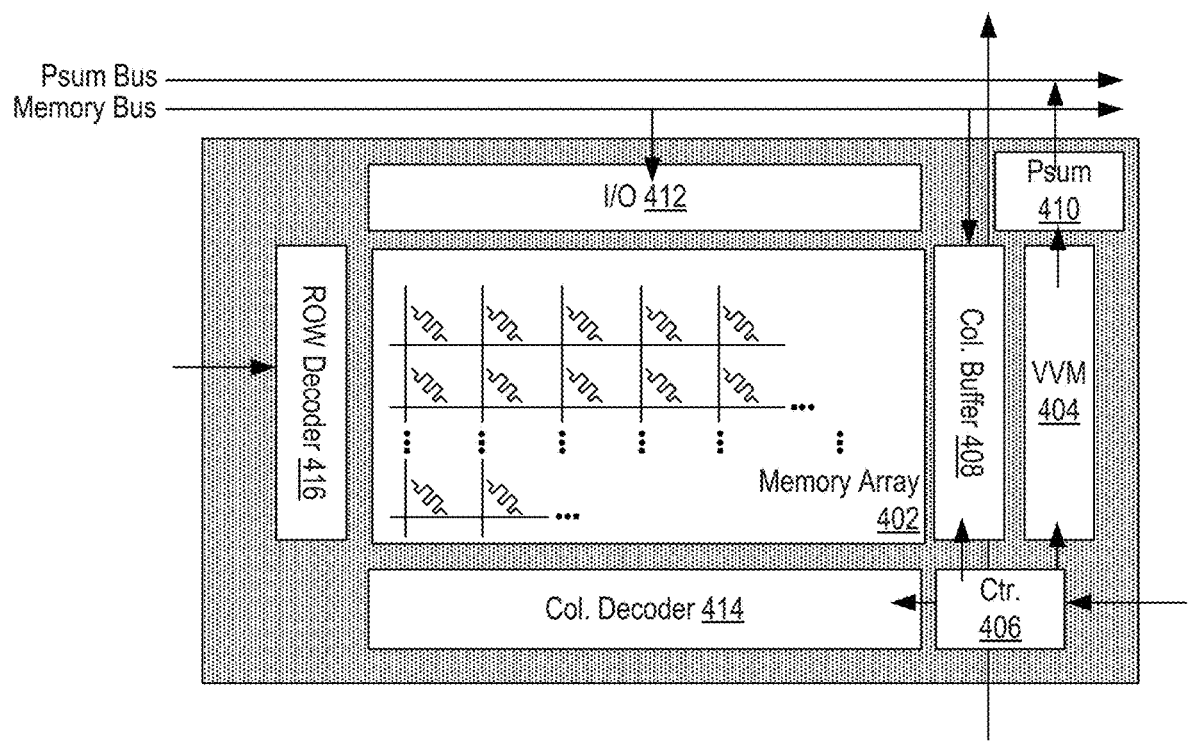
FIG. 4 illustrates a block diagram of an exemplary PIM block in the apparatus in FIG. 3, according to some embodiments of the present disclosure.

As described above, each PIM block 202 may be an identical PIM device that can be configured into either the memory mode or computing mode. Referring to FIG. 4, each PIM block 202 can include a memory array 402 and a VVM engine 404 configured to be disabled in the memory mode. In some embodiments, memory array 402 includes a ReRAM array. It is understood that in other examples, memory array 402 may include any other suitable memory, including but not limited to, phase-change random-access memory (PRAM), magnetoresistive random-access memory (MRAM), ferroelectric random-access memory (FRAM), to name a few. Memory array 402 can store a first vector. PIM block 202 can further include a control circuit 406 configured to, in the computing mode, enable VVM engine 404 and control VVM engine 404 to perform a dot product between the first vector and a second vector to generate a partial sum. Control circuit 406 can be further configured to, in the memory mode, disable VVM engine 404 and control memory array 402 to write in or read out the first vector.

In some embodiments, PIM block 202 further includes peripheral circuits, including row decoder 416 and column decoder 414, for facilitating the operations of memory array 402. The peripheral circuits can include any suitable digital, analog, and/or mixed-signal peripheral circuits used for facilitating the operation of memory array 402. For example, the peripheral circuits can include one or more of a page buffer, a decoder (e.g., row decoder 416 and column decoder 414), a sense amplifier, a driver, a charge pump, a current or voltage reference, or any active or passive components of the circuits (e.g., transistors, diodes, resistors, or capacitors). PIM block 202 can also include a memory I/O interface 412 operatively coupled between memory array 402 and the memory bus to write in and read out the first vector between the memory bus and memory array 402. PIM block 202 can further include various buffers for intermediate data storage, including a column buffer 408 configured to receive and buffer the second vector, for example, from another PIM device through the memory bus, as well as a partial sum buffer 410 configured to buffer and send the partial sum to another PIM device through a partial sum bus.

Figure 5A:
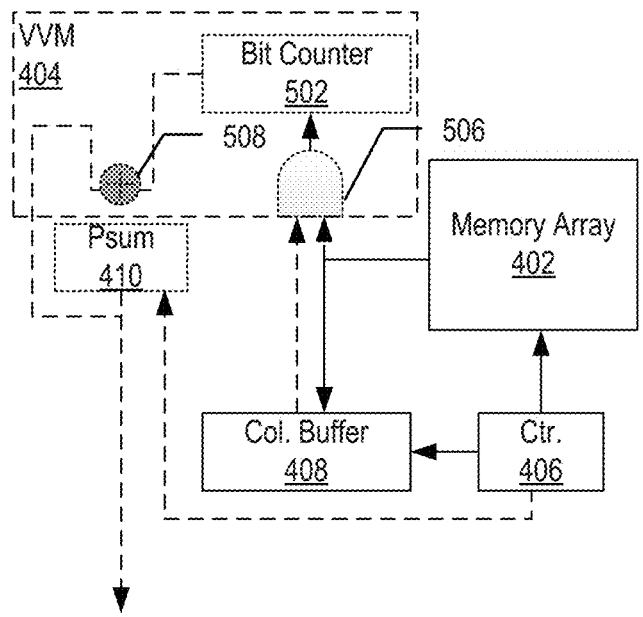
FIG. 5A illustrates a detailed block diagram of the PIM block in FIG. 4 in the memory mode, according to some embodiments of the present disclosure.
Figure 5B:
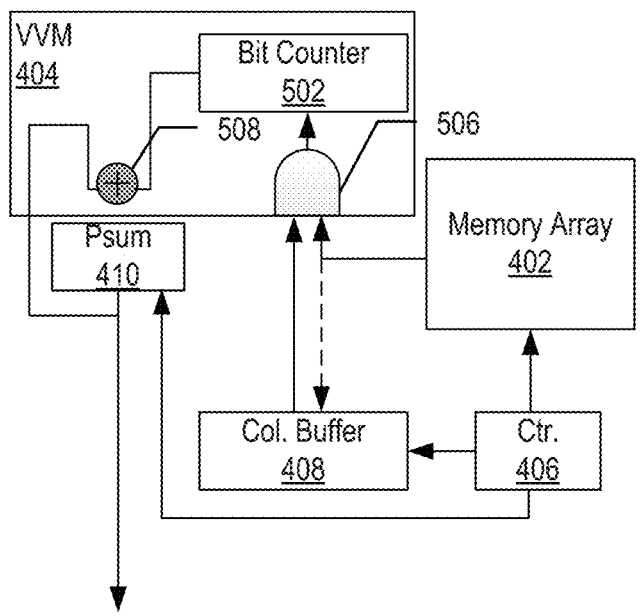
FIG. 5B illustrates a detailed block diagram of the PIM block in FIG. 4 in the computing mode, according to some embodiments of the present disclosure.

FIG. 5A illustrates a detailed block diagram of PIM block 202 in FIG. 4 in the memory mode, according to some embodiments of the present disclosure. FIG. 5B illustrates a detailed block diagram of PIM block 202 in FIG. 4 in the computing mode, according to some embodiments of the present disclosure. VVM engine 404 can include a bit counter 502, a shift accumulator 508, and a plurality of AND gates 506. As shown in FIG. 5A, control circuit 406 can disable VVM engine 404 and partial sum buffer 410 (shown in dash lines) in the memory mode, such that PIM block 202 works as a memory element for storing the first vector in memory array 402. As shown in FIG. 5B, control circuit 406 can enable VVM engine 404 and partial sum buffer 410 (shown in solid lines) in the computing mode, such that the first vector stored in memory array 402 and the second vector buffer in column buffer 408 can be sent to VVM engine 404 to calculate the dot product of the first and second vectors, which can be buffered as the partial sum in partial sum buffer 410.

In one example of performing the convolution of a feature map and a kernel in CNN, when PIM block 202 is in the memory mode, it works as a memory that supports read and write accesses; when PIM block 202 is in the computing mode, it can perform VVM to compute the partial sum of output feature maps in CNN executions with reconfigurable data precision. In the memory mode, when accessing the feature maps in PIM block 202, only column buffer 408 may be activated (memory array 402 and control circuit 406 are always on during any operations). Column buffer 408 may be used to buffer the input data that are being accessed on each row of a memory column. Memory array 402 may need to support both row and column accesses. In the computing mode, partial sum buffer 410 and VVM engine 404 are activated, and the computation of the performed VVM may be expressed as:

$$P_{sum} = \sum_{r=0}^{Row-1} \sum_{i=0}^{N-1} \sum_{j=0}^{M-1} a_{i,r} b_{j,c} * 2^{i+j}, \quad (1)$$

where a and b are the columns of the feature map originally stored in first set of PIM blocks 312 (PIM block 202 in the memory mode) and the kernel stored in second set of PIM blocks 314 (PIM block 202 in the computing mode), respectively. It is noted that a may have been loaded into column buffer 408 of PIM block 202 in the computing mode during the preparation phase. N and M are the bitwidths of a and b, respectively. After b is read out from a column of memory array 402 of PIM block 202 in the computing mode, it may be sent into VVM engine 404 to perform the dot product between a and b, or $a \cdot b = [a_0 b_0, \ldots, a_{row-1} b_{row-1}]$ using AND gates 506. $a \cdot b$ may be sent into bit counter 502 to calculate the sum of the elements of $a \cdot b$. If the bitwidths of the feature map and the kernel are not 1 (i.e., binary precision), the above process may repeat for N×M times to compute the dot products between higher-order bits of a and b. A shift-accumulation operation may be needed to compute the sum of the dot products with different weights, and partial sum buffer 410 may be used to store the intermediate partial sums. To handle negative values, VVM engine 404 may be duplicated to process both positive and negative accumulations in parallel. The sign bit of every element in the vector may be read first from memory array 402 and determine which VVM engine 404 may execute the accumulation of positive or negative data. The negative partial sum then may be subtracted from the positive partial sum during the partial sum accumulation.

Referring back to FIG. 3, controller 206 can be configured to perform a data mapping process to map the first matrix to first set of PIM blocks 312 and map the second matrix to second set of PIM blocks 314. In some embodiments, the dimensions of first set of PIM blocks 312 are smaller than the dimensions of the first matrix. For example, the first matrix may be a feature map in CNN. Controller 206 can be configured to map the first matrix to first set of PIM blocks 312, such that first set of PIM blocks 312 store part of the first matrix at the same time based on the dimensions of first set of PIM blocks 312. That is, the first matrix may be "folded" to become a plurality of pieces each fitting the dimensions of first set of PIM blocks 312. In some embodiments, the dimensions of second set of PIM blocks 314 match the dimensions of the second matrix. For example, the second matrix, such as a kernel in CNN, may have three or more dimensions. Controller 206 can be configured to map the second matrix to second set of PIM blocks 314, such that each PIM block 202 of second set of PIM blocks 314 stores the respective portion of the second matrix. That is, the number of PIM blocks 202 and the layout of second set of PIM blocks 314 may be determined based on the number of elements and the layout of the second matrix to form a one-to-one mapping between PIM blocks 202 in second set of PIM blocks 314 and the elements in the second matrix.

Continuing the example above of performing the convolution of the feature map and the kernel in CNN, in inference, the weights of a network layer (i.e., the kernel) may be stored in second set of PIM blocks 314, and the feature maps may be stored in first set of PIM blocks 312. Since the feature maps and kernels may be high dimension tensors, they may be first unrolled into a number of vectors, and then stored in memory array 402 of PIM block 202 column by column. As described below in detail, such a column-wise arrangement may be convenient to support reconfigurable data precision.

Figure 6A:
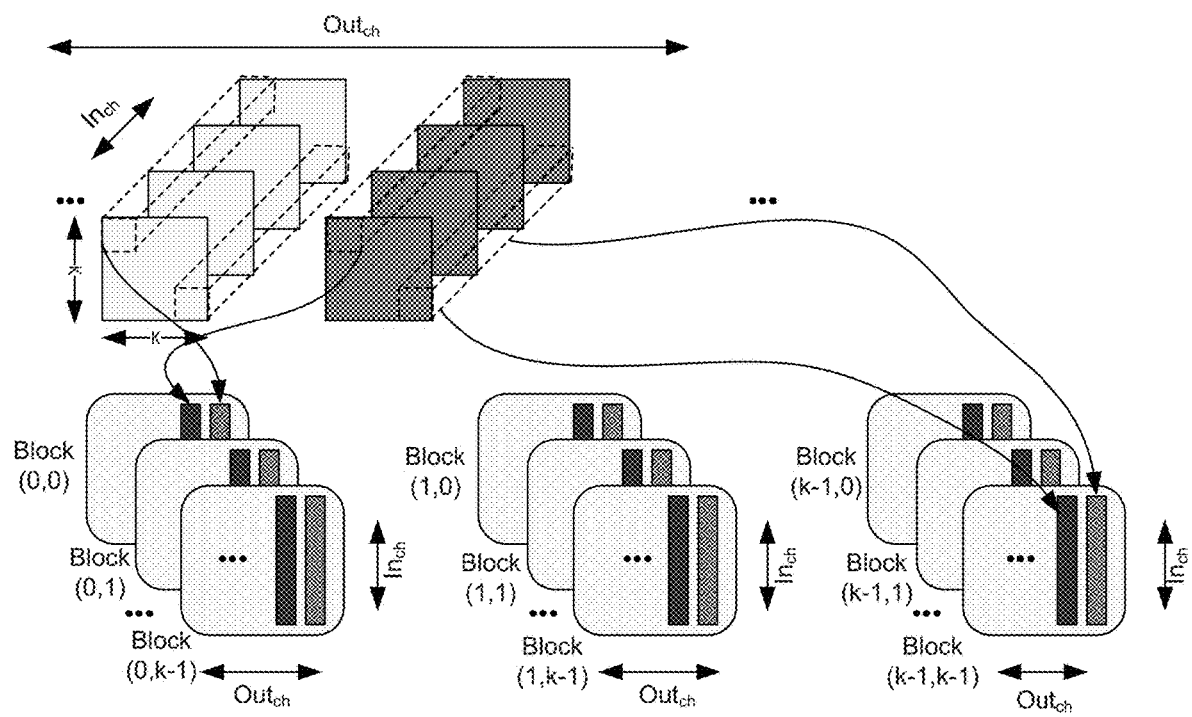
FIG. 6A illustrates an exemplary mapping scheme for PIM blocks in the computing mode in matrix multiplication, according to some embodiments of the present disclosure.

Assuming the configuration of the kernels is represented by $[In_{ch}, Out_{ch}, K, K]$, where $In_{ch}$ is the number of input channels, $Out_{ch}$ is the number of output channels, and K is the dimension of the kernel. The configuration of the feature maps is represented by $[In_{ch}, H, W]$, where H and W are the height and width of the feature maps, respectively. The size of memory array 402 of each PIM block 202 is [Row, Col], where Row and Col are the numbers of rows and columns, respectively The bitwidths of the kernel weights and the feature map parameters are N and M, respectively. Each memory cell may only reliably store a binary value, i.e., '0' and '1.' For the $In_{ch}$ kernels that have a size of K×K and correspond to the same output channel, the elements at the same position of the $In_{ch}$ kernels may be grouped into a vector, and the vector may be mapped into a column of one PIM block 202 in second set of PIM blocks 314. The elements at different positions of the kernels may be mapped into different PIM blocks 202 in second set of PIM blocks 314. Hence, the kernels may be mapped into total K×K PIM blocks 202 in second set of PIM blocks 314, as shown in FIG. 6A. If the bitwidth of the kernel weight N>1, then N memory cells at different columns in memory array 402 may be needed to represent one kernel element, assuming $In_{ch} \leq Row$ and $Out_{ch} \times N \leq Col$. If $In_{ch} > Row$ or $Out_{ch} \times N > Col$, the mapping may need to be extended to more PIM blocks 202 in second set of PIM blocks 314.

Figure 6B:
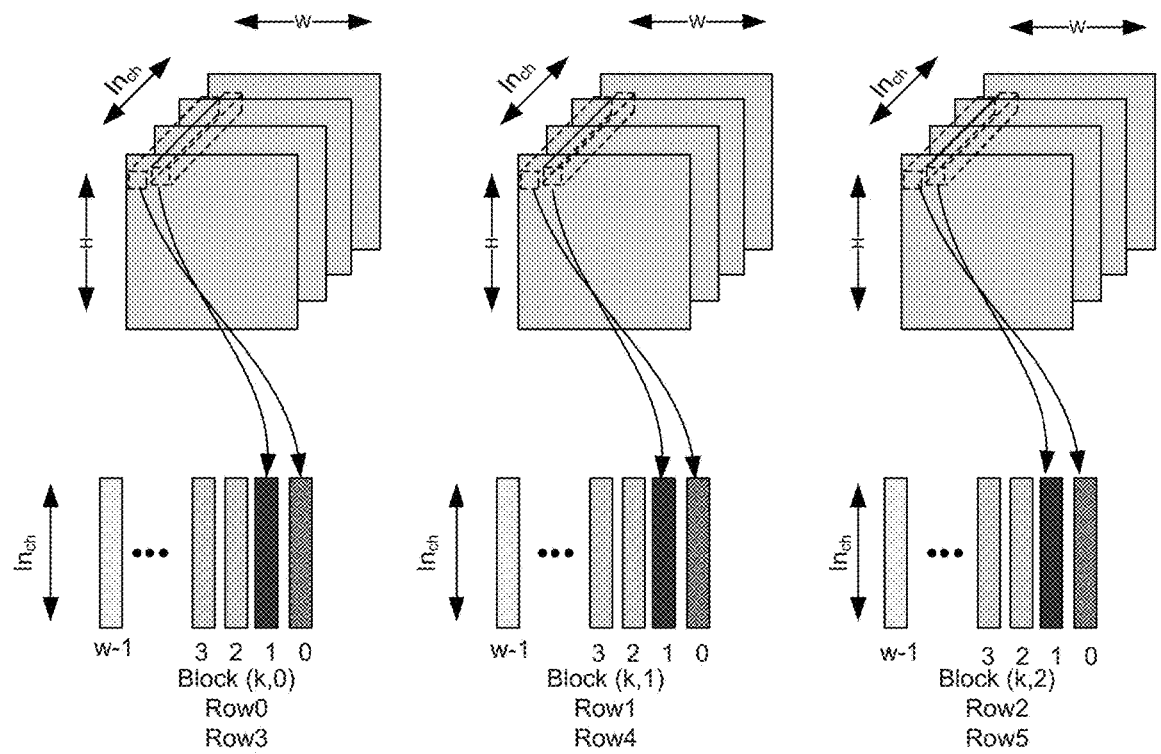
FIG. 6B illustrates an exemplary mapping scheme for PIM blocks in the memory mode in matrix multiplication, according to some embodiments of the present disclosure.

FIG. 6B illustrates the mapping of feature maps into first set of PIM blocks 312. The elements at the same position of the same row of $In_{ch}$ different feature maps may be grouped into a vector, and the vector may be mapped into a column of one PIM block 202 in first set of PIM blocks 312. The element position then may slide horizontally, and the grouped vector may be mapped into a different column in the same PIM block 202 in first set of PIM blocks 312. There may be total W such vectors that cover the elements on the same row of all the feature maps and are mapped into PIM block 202 in first set of PIM blocks 312. If the bitwidth of the feature maps N>1, N memory cells at different columns of memory array 402 may be needed to represent one feature map parameter. After that, moving to the next row in the feature maps, everything above may be repeated to map this new row of the feature maps into another PIM block 202 in first set of PIM blocks 312. It is noted that each time only K rows of the feature maps may need to be stored to facilitate the computation. When the K+1 row is needed, it can overwrite the locations of the 1st row in the first set of PIM block 312. If $In_{ch} > Row$ or W×N>Col, the mapping may need to be extended to more PIM blocks 202 in first set of PIM blocks 312.

Figure 7:
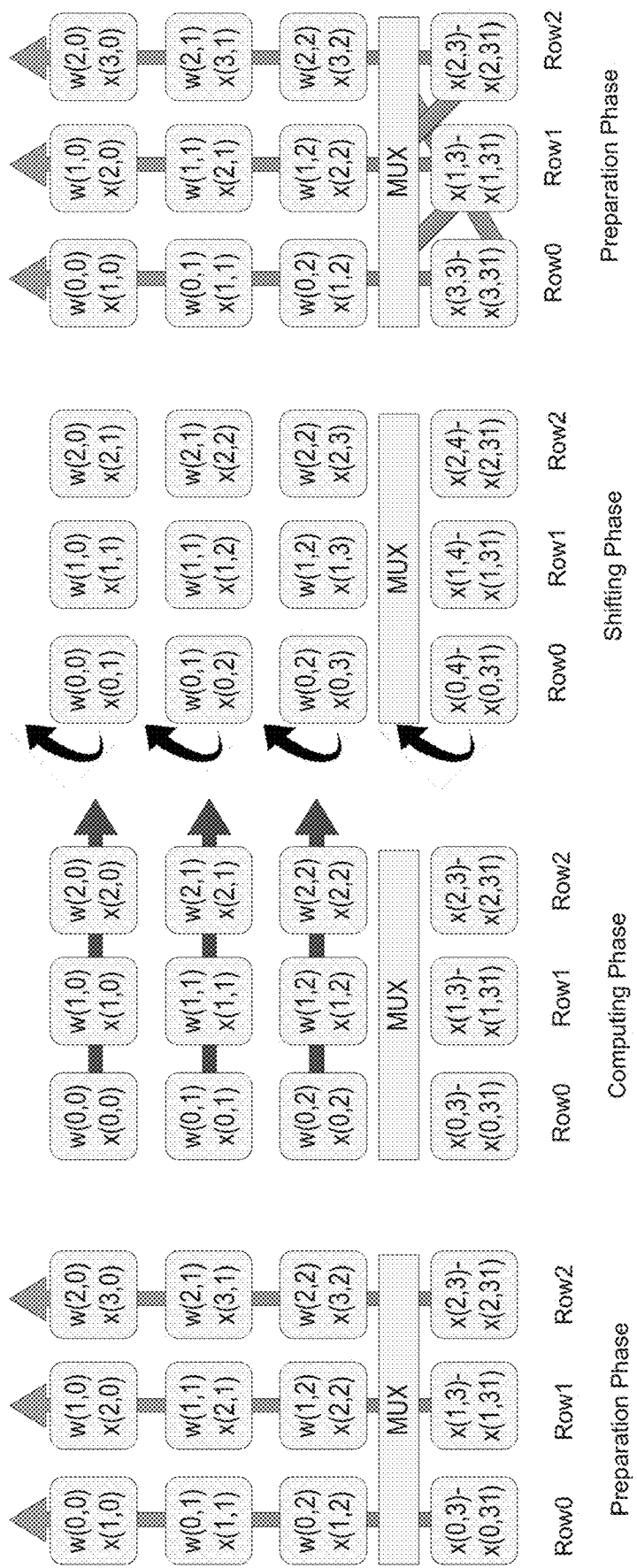
FIG. 7 illustrates an exemplary data flow between different PIM blocks in matrix multiplication, according to some embodiments of the present disclosure.

For example, to compute a CONV3×3 layer in VGG-Net with a kernel of [256,32,3,3] and feature maps of [256,32, 32] using PIM blocks 202 with a memory array size of 256×256, the feature maps and the kernels may need to be mapped into first set of PIM blocks 312 having 3 PIM blocks 202 (referring to hereafter as "Comp.block") and second set of PIM blocks 314 having 9 PIM blocks 202 (referring to hereafter as "Mem.block"), respectively, as shown in FIG. 7. The Comp.block block(i,j) (i,j=0,1,2) represents the elements (i,j) in the $In_{ch} \times c_h$ kernels, and the Mem.block block (3,j) (j=0,1,2) represents the jth row of the feature maps that participating in the computation.

To map the kernels of an FC layer into PIM blocks 202 in second set of PIM blocks 314, the columns of the weight matrix are directly mapped into the columns of PIM blocks 202 and multiple columns of PIM blocks 202 may be combined to support a high precision of the weights. Again, if the size of the weight matrix is larger than that of second set of PIM blocks 314, the weight matrix may be mapped to multiple second sets of PIM blocks 314.

Figure 8:
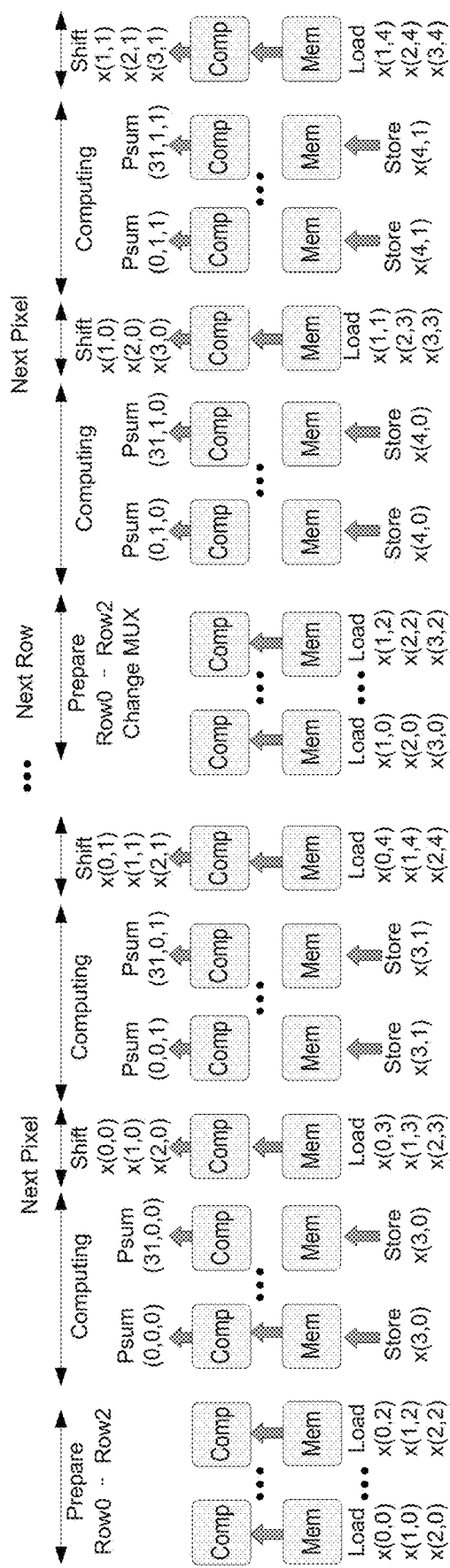
FIG. 8 illustrates an exemplary computation flow between different PIM blocks in matrix multiplication, according to some embodiments of the present disclosure.

After data mapping, controller 206 is configured to control second set of PIM blocks 314 to perform the convolution of the first and second matrices in calculating the partial sums of the third matrix, according to some embodiments. Continuing the example above of performing the convolution of the feature map and the kernel in CNN, the computation of convolution may be divided into three phases— preparation, computation, and shifting, as shown in FIG. 8.

In the preparation phase, the feature maps may be first read out from the Mem.block column by column and sent into the input of each rows of the Comp.block. The data transfer direction may be determined by the row index $R_{out}$ of the output feature maps to be computed. For example, $R_{out}=0$ is at start of the convolution. The column i (i=0,1,2) of the block(3,j) (j=0,1,2) may be read out and sent into the inputs of the block(i,j) (i, j=0,1,2) to compute the row $R_{out}=0$. After the row $R_{out}=0$ is obtained, $R_{out}$ moves to 1. The locations that store the 0th row of the input feature map in block(3,0) may be overwritten by the 3rd row. The column i (i=0,1,2) of the block(3,j) (j=0,1,2) may be read out and sent into the inputs of the block(i,(j+2)%3) (i, j=0,1,2) to compute the row $R_{out}=1$, as shown in FIG. 8. In general, the column i (i=0,1,2) of the block(3,j) (j=0,1,2) may be read out and sent into the inputs of the block(if (j)) (i, j=0,1,2) to compute the row $R_{out}$. The function $f(j, R_{out})$ can be expressed as:

$$f(j, R_{out}) = (j+K-R_{out} \% K) \% K \qquad (2),$$

where K is 3 in the present example.

In the computing phase, the Comp.block may compute the VVM results between feature maps and weights as:

$$P_{sum_{i,j,oc}} = \sum_{ic=0}^{InCh-1} X_{i,j,ic} W_{oc,ic,i,j}, \quad (3)$$

where i, j are the indexes of PIM block 202 in the array, ic, oc are the indexes of the input and output channels, respectively, $X_{i,j,ic}$ is the icth input channel of the feature maps stored in the block(i, j), and $W_{oc,ic,i,j}$ is the icth input channel of the oc output channel of the kernels stored in the block(i, j). In the present example, total 3×3=9 partial sums may be generated in block(0,0)-block(2,2) at the same time. All these 9 partial sums may be accumulated by accumulator 208 to generate the corresponding elements of the output feature maps. It is noted that the above computation may be repeated for $Out_{ch}$ times to generate the elements at the same position of total $Out_{ch}$ feature maps. In the present example, $Out_{ch}$ is 32.

During the computation phase, the $R_{out}$+K row of the input feature maps may be stored into the Mem.block and overwrite the location of the $R_{out}$ row, as aforementioned. In the shifting phase, the column $C_{out}$+K−1 of the block(3,j) (j=0,1,2) may be read out, where $G_{out}$ is the column index of the output feature maps to be computed. Then the inputs of block(i,j) may be shifted to block(i−1,j) (i, j=0,1,2) and the columns $C_{out}$+K−1 of block(3,j) may be sent to block(2f(j)), as described above. It is noted that such a subtle shifting design avoids making multiple copies of the feature map elements and thus, reduce the energy consumption associated with memory writes.

Figure 9:
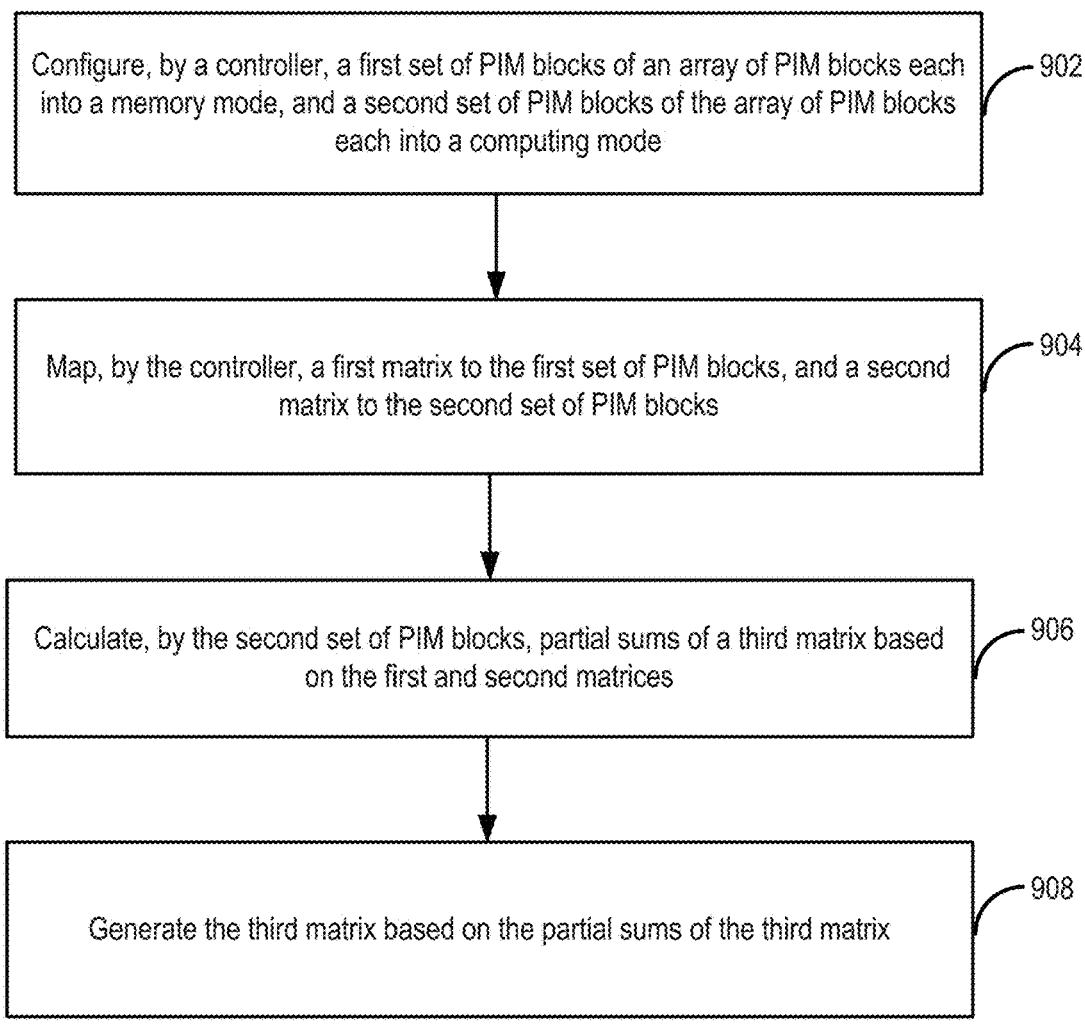
FIG. 9 is a flowchart of an exemplary method for matrix multiplication implemented by an array of PIM blocks, according to some embodiments of the present disclosure.

FIG. 9 is a flowchart of an exemplary method 900 for matrix multiplication implemented by an array of PIM blocks, according to some embodiments of the present disclosure. Examples of array of PIM blocks depicted in FIG. 9 include array of PIM blocks 202 depicted in FIG. 3. It should be understood that the operations shown in method 900 are not exhaustive and that other operations can be performed as well before, after, or between any of the illustrated operations. Further, some of the operations may be performed simultaneously, or in a different order than shown in FIG. 9.

Referring to FIG. 9, method 900 starts at operation 902, in which a first set of PIM blocks of the array of PIM blocks each is configured by a controller into a memory mode, and a second set of PIM blocks of the array of PIM blocks each is configured by the controller into a computing mode. In some embodiments, the first set of PIM blocks consists of a row of the array of PIM blocks, and the second set of PIM blocks consists of the remainder of the array of PIM blocks. As shown in FIG. 3, controller 206 can configure each PIM block 202 in first set of PIM blocks 312 into the memory mode and configure each PIM block 202 in second set of PIM blocks 314 into the computing mode.

Method 900 proceeds to operation 904, as illustrated in FIG. 9, in which a first matrix is mapped by the controller to the first set of PIM blocks, and a second matrix is mapped by the controller to the second set of PIM blocks. In some embodiments, the first matrix includes a feature map in a CNN, and the second matrix includes a kernel of the CNN. In some embodiments, the dimensions of the first set of PIM blocks are smaller than the dimensions of the first matrix, and part of the first matrix is stored by the first set of PIM blocks at the same time based on the dimensions of the first set of PIM blocks. In some embodiments, the dimensions of the second set of PIM blocks match the dimensions of the second matrix. For example, the second matrix may have three or more dimensions, and a respective portion of the second matrix may be stored by each PIM block of the second set of PIM blocks. As shown in FIG. 3, controller 206 can map the first matrix, such as a feature map, to first set of PIM blocks 312 and map the second matrix, such as a kernel, to second set of PIM blocks 314.

Method 900 proceeds to operation 906, as illustrated in FIG. 9, in which partial sums of a third matrix are calculated by the second set of PIM blocks based on the first and second matrices. In some embodiments, data from each PIM block of the first set of PIM blocks is directed by a MUX between the first and second sets of PIM blocks to the PIM blocks in a corresponding column of the second set of PIM blocks. In some embodiments, at least one PIM block of the first set of PIM blocks is not in the same corresponding column In some embodiments, calculating the partial sums of the third matrix includes performing the convolution of the first and second matrices. As shown in FIG. 3, MUX 204 between first and second sets of PIM blocks 312 and 314 can direct the data therebetween, and second set of PIM blocks 314 can calculate the partial sums of a third matrix based on the first and second matrices.

Method 900 proceeds to operation 908, as illustrated in FIG. 9, in which the third matrix is generated based on the partial sums of the third matrix. As shown in FIG. 3, the third matrix can be generated by accumulator 208 based on the partial sums of the third matrix calculated by second set of PIM blocks 312.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

The breadth and scope of the present disclosure should not be limited by any of the above-described exemplary embodiments, but should be defined only in accordance with the following claims and their equivalents.

What is claimed is:

1. An apparatus for matrix multiplication, comprising:
an array of processing-in-memory (PIM) blocks in rows and columns, each of which is configured into a computing mode or a memory mode, wherein each NM block in the array of PIM blocks comprises a memory array, buffer, and a vector-vector multiplication (VVM)

engine, wherein the memory array of a PIM block is configured to store a first vector, and wherein the buffer of the PIM block is configured to load a second vector from another PIM block;

a controller configured to divide the array of PIM blocks into a first set of PLM blocks each configured into the memory mode such that the VVM engine in each PIM block in the first set of PIM blocks is disabled and a second set of PIM blocks each configured into the computing mode such that the VVM engine in each PIM block in the second set of RIM blocks is enabled and the second vector is loaded into the buffer from the another PIM block, wherein the first set of PIM blocks are configured to store a first matrix, and the second set of PIM blocks are configured to store a second matrix and calculate partial sums of a third matrix based on the first and second matrices; and an accumulator configured to output the third matrix based on the partial sums of the third matrix.

2. The apparatus of claim 1, wherein the first set of PIM blocks includes a row of the array of PIM blocks, and the second set of PIM blocks includes a remainder of the array of PIM blocks.

3. The apparatus of claim 2, wherein dimensions of the first set of PIM blocks are smaller than dimensions of the first matrix, and the controller is configured to map the first matrix to the first set of PIM blocks such that the first set of PIM blocks concurrently store parts of the first matrix based on the dimensions of the first set of PIM blocks.

4. The apparatus of claim 3, further comprising a multiplexer (MUX) between the first set of PIM blocks and the second set of PIM blocks, wherein the controller is further configured to control the MUS to direct data from each PIM block of the first set of PIM blocks to the PIM blocks in a corresponding column of the second set of PIM blocks.

5. The apparatus of claim 4, wherein at least one PIM block of the first set of PIM blocks is not in a same corresponding column.

6. The apparatus of claim 1, wherein dimensions of the second set of PIM blocks match dimensions of the second matrix.

7. The apparatus of claim 6, wherein the second matrix has three or more dimensions, and the controller is configured to map the second matrix to the second set of PIM blocks such that each PIM block of the second set of PIM blocks stores a respective portion of the second matrix.

8. The apparatus of claim 1, wherein the controller is configured to control the second set of PIM blocks to perform convolution of the first and second matrices in calculating the partial sums of the third matrix.

9. The apparatus of claim 8, wherein the first matrix comprises a feature map in a convolution neural network (CNN), and the second matrix comprises a kernel of the CNN.

10. A processing-in-memory (PIM) device, comprising:
a memory array configured to store a first vector;
a first buffer configured to receive and buffer a second vector from another PIM device;
a vector-vector multiplication (VVM) engine; and
a control circuit configured to:
in a computing mode, enable the VVM engine and control the VVM engine to perform a dot product between the first vector and the second vector to generate a partial sum; and
in a memory mode, disable the VVM engine and control the memory array to write in or read out the first vector.

11. The PIM device of claim 10, wherein the VVM engine comprises a bit counter, a shift accumulator, and a plurality of AND gates.

12. The PIM device of claim 10, further comprising a second buffer configured to buffer and send the partial sum to another PIM device.

13. A method for matrix multiplication implemented by an array of processing-in-memory (PIM) blocks, the method comprising:
configuring, by a controller, a first set of PIM blocks of the array of PIM blocks each into a memory mode such that a vector-vector multiplication (VVM) engine in each PIM block of the first set of PIM blocks is disabled, and a second set of PIM blocks of the array of PIM blocks each into a computing mode such that a VVM engine of each PIM block of the second set of PIM blocks is enabled, a first vector is read from a memory array of each PIM block of the second set of PIM blocks to an associated VVM engine, and a second vector is loaded into a buffer of each PIM block of the second set of PIM blocks from another PIM block;
mapping, by the controller, a first matrix to the first set of PLM blocks, and a second matrix to the second set of PIM blocks;
calculating, by the second set of PIM blocks, partial sums of a third matrix based on the first and second matrices; and
generating the third matrix based on the partial sums of the third matrix.

14. The method of claim 13, wherein the first set of PIM blocks includes a row of the array of PIM blocks, and the second set of PIM blocks includes a remainder of the array of PIM blocks.

15. The method of claim 14, wherein dimensions of the first set of PIM blocks are smaller than dimensions of the first matrix, and the method further comprises concurrently storing, by the first set of PIM blocks, parts of the first matrix based on the dimensions of the first set of PIM blocks.

16. The method of claim 15, further comprising directing, by a multiplexer (MUX) between the first set of PIM blocks and the second set of PIM blocks, data from each PIM block of the first set of PIM blocks to the PLM blocks in a corresponding column of the second set of REM blocks.

17. The method of claim 13, wherein dimensions of the second set of PIM blocks match dimensions of the second matrix.

18. The method of claim 17, wherein the second matrix has three or more dimensions, and the method further comprises storing, by each PIM block of the second set of PIM blocks, a respective portion of the second matrix.

* * * * *